(No Model.)  3 Sheets—Sheet 1.

D. MURRAY.
BARREL MAKING MACHINE.

No. 322,960.  Patented July 28, 1885.

Witnesses
G. M. Gridley
Malbert Schinnel

David Murray
Inventor
By Erwin W Benedict
Attorneys (No Model.)  3 Sheets—Sheet 2.

D. MURRAY.
BARREL MAKING MACHINE.

No. 322,960. Patented July 28, 1885.

Witnesses
G. M. Gridley
Matthew Schinner

David Murray
Inventor
By Erwin V. Benedict
Attorneys (No Model.) 3 Sheets—Sheet 3.
D. MURRAY.
BARREL MAKING MACHINE.
No. 322,960. Patented July 28, 1885.
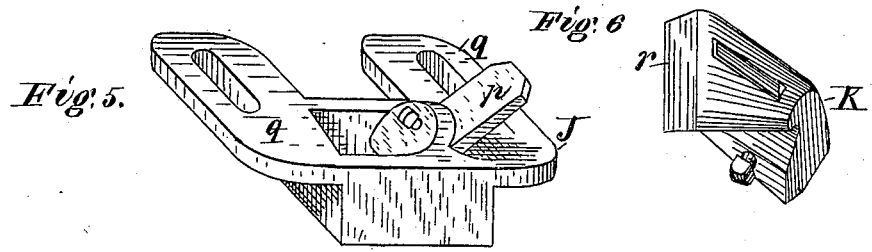
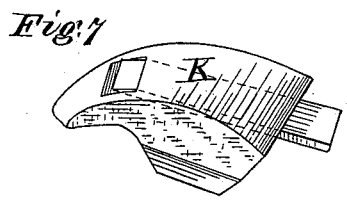
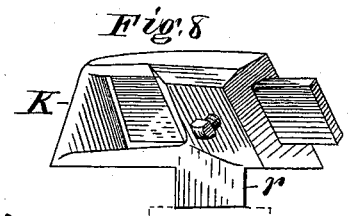
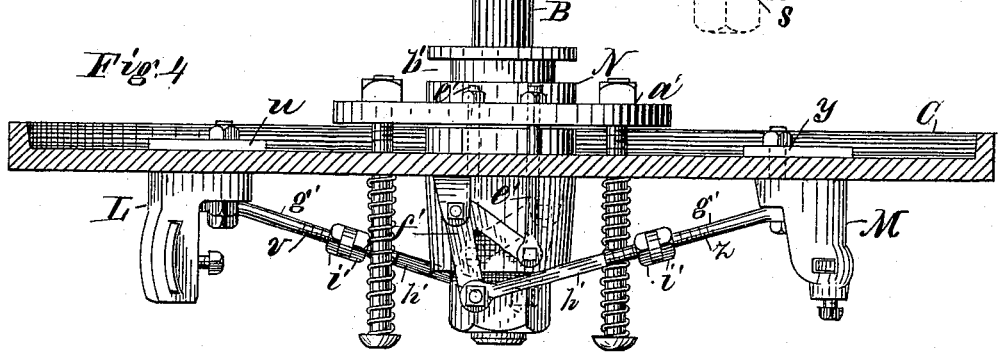
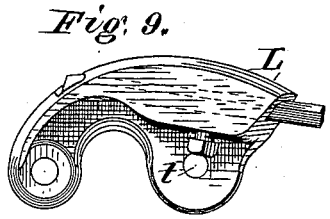
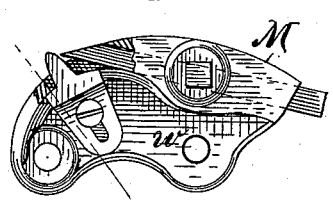
Witnesses
G. M. Gridley
Matthew Schinner
David Murray
Inventor
By Erwin T. Benedict
Attorneys

UNITED STATES PATENT OFFICE.

DAVID MURRAY, OF MILWAUKEE, WISCONSIN.

BARREL-MAKING MACHINE.

SPECIFICATION forming part of Letters Patent No. 322,960, dated July 28, 1885.

Application filed November 3, 1884. (No model.)

*To all whom it may concern:*

Be it known that I, DAVID MURRAY, a citizen of the United States, residing at Milwaukee, in the county of Milwaukee and State of Wisconsin, have invented certain new and useful Improvements in Barrel-Making Machines; and I do hereby declare the following to be a full, clear, and exact description of the invention, such as will enable others skilled in the art to which it appertains to make and use the same, reference being had to the accompanying drawings, and to letters or figures reference marked thereon, which form a part of this specification.

My invention, to be hereinafter claimed, relates to improvements in machines for leveling, howeling, crozing, and chamfering barrels, casks, &c.

My apparatus and the devices of which it is composed may be readily and fully understood by the following description, with a reference to the accompanying drawings, in which—

Figure 1:
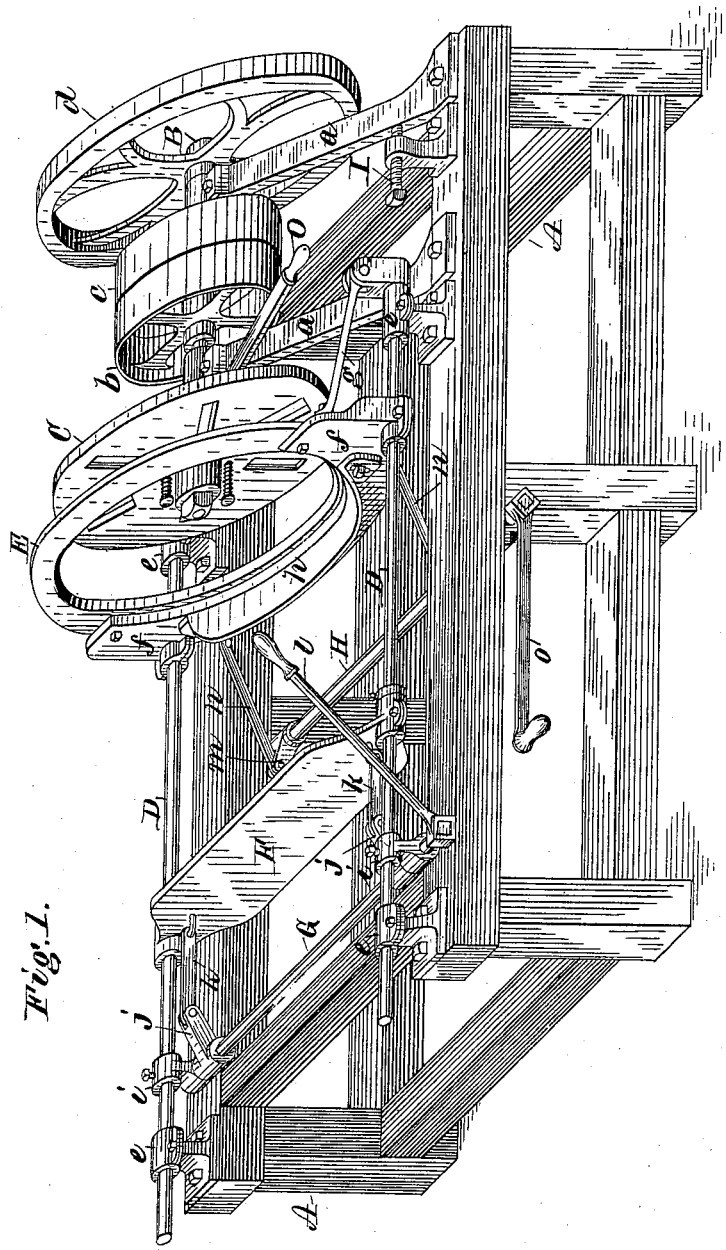
Figure 2:
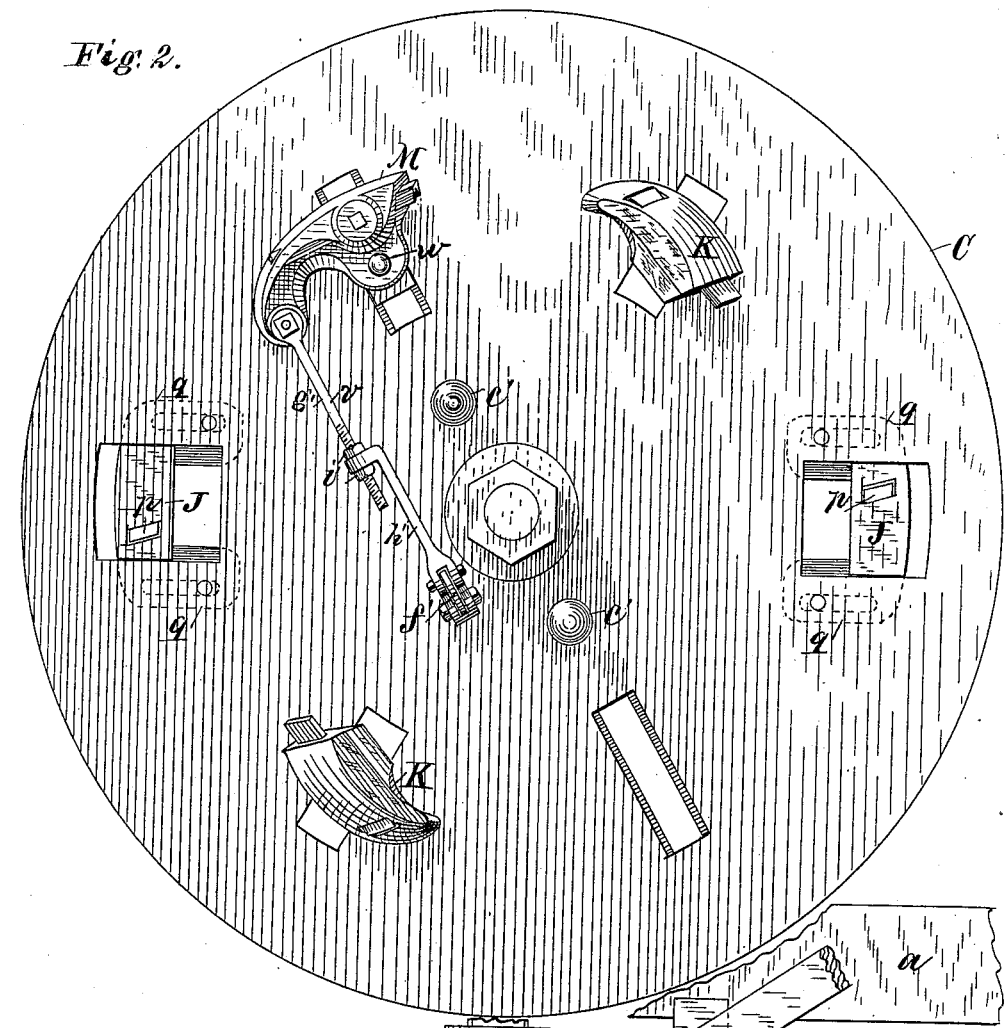
Figure 3:
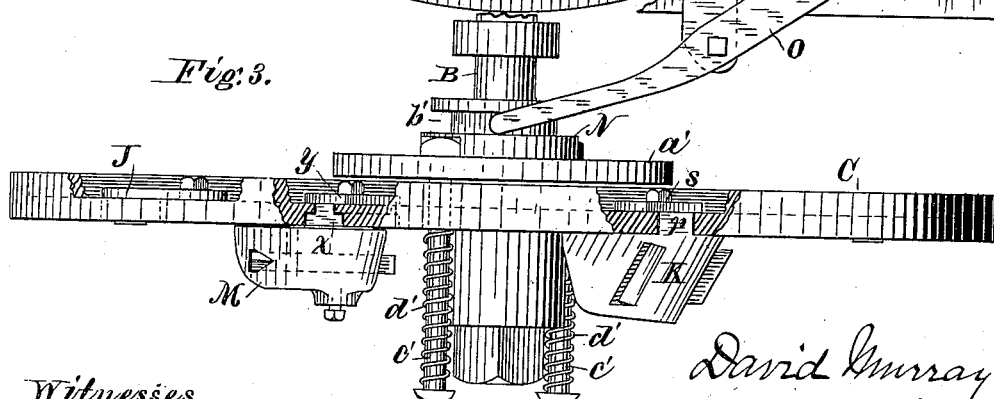

Figure 1 is a perspective view of the entire machine. Fig. 2 is a front view of the face-plate with leveling, chamfering, and crozing tools attached thereto. Fig. 3 is a top (edge) view of the same face-plate, showing a leveling, a chamfering, and a crozing tool attached thereto, and also part of the device by which the howeling and crozing tools are held up to and removed from their work, the plate being also broken away in places, showing the means and manner of attaching the cutting-tools thereto. Fig. 4 is a side (edge) view of the same face-plate, (the plate being in section,) showing also other parts of the device for holding the howeling and crozing tools up to and removing them from their work. Fig. 5 is the leveling-tool. Figs. 6, 7, and 8 are several views of the chamfering-tool. Fig. 9 is a view of the howeling-tool, shown also directly above in Fig. 4 attached to the face-plate. Figs. 10 and 11 are views of one form of crozing-tools, also shown directly above in Fig. 4, attached to the face-plate.

The same letters refer to like parts in all the views.

A is the frame upon which my apparatus is supported.

Above and upon one end of the longitudinal frame A, I support, by the rigid brackets $a\,a$ or other equivalent means, the revolving driving shaft or mandrel B, having journal-bearings in the brackets $a\,a$, said mandrel being provided with a rigid pulley, $b$, loose pulley $c$, balance-wheel $d$, and face-plate C, which face-plate is at the inner end of the mandrel. The mandrel B has its axis parallel with the long axis of the frame A, and has no sliding or horizontal movement.

On the top of the frame A at its two sides, respectively, and extending toward the other end from the brackets $a\,a$, are the two parallel horizontal rods D D, supported near their respective ends by and having a free horizontal sliding movement in brackets $e\,e\,e\,e$, which brackets are rigid to the frame A.

Supported on the rods D D is the barrel-holding apparatus consisting, first, of the vertical ring E, having an opening of such size as to permit the end of such a barrel or cask as is intended to be operated on to pass a little way only therethrough, which ring is removably affixed to the cross-bar $f$, which cross-bar $f$ is adjustably affixed at its respective ends to the rods D D, and I preferably add on each side the brace $g$, which is adjustably affixed at one end to the cross-bar $f$, and at its other end to the rod D, and also a curved flange, $h$, beneath the opening of the ring E, and extending inwardly from and rigid to the cross-bar $f$, which flange $h$ is adapted to receive and support and guide the end of the barrel as it is placed upon this barrel-supporting apparatus before and while entering the ring E; and, second, of the cross bar or plate F, which cross-bar is in front of the ring E, and is supported at its respective ends and slides upon the rods D D, and is provided on its lower inner face with an inwardly-extending flange similar to the flange $h$, adapted to receive and support thereon the other end of the barrel.

In front of the cross-plate F is the cross-rod G, having bearings and revolving in brackets $i\,i$, which brackets $i\,i$ depend from and slide upon the rods D D, and are adjustably affixed thereto by set-screws or other equivalent means. Rigid to this cross-rod G are short arms $j\,j$, and pivoted in the free ends of said arms are the connecting rods or links $k\,k$, which at their other extremity are pivoted to the cross-plate F, said arms and links forming a toggle-joint adapted to press said cross-plate F rearwardly away from said cross-rod G, and to draw it forward toward said cross-rod G, which forward and backward movement is accomplished by power applied to said cross-rod by and through the hand-lever $l$, removably affixed to the end of said cross-rod G. By constructing the barrel-supporting apparatus as just described, I provide a comparatively low barrel-carriage, which obviates lifting the barrels so much above the supporting-frame to place them in and remove them from the carriage, as has been necessary with the machines heretofore in use.

In front of the cross-bar $f$ is the cross-rod H, having bearings and revolving in brackets rigid to the frame A, said cross-rod H being provided with rigid short arms $m$ $m$; and pivoted in the free outer ends of the said arms $m$ $m$, are the connecting rods or links $n$ $n$, which links $n$ $n$ at their other extremities are pivoted to the front of the cross-bar $f$, said arms and links forming a toggle-joint adapted to press said cross-bar $f$ rearward away from said cross-rod H, and draw it forward toward said cross-rod H, which backward and forward movement is secured by revolving said cross-rod H by power applied to said cross-rod by and through the hand-lever $o$, removably affixed to the end of said cross-rod H. I provide set-screws I I, one on each side of the apparatus, in the rear of the ends of the rods D D, held by and adjustable in brackets rigid to the frame A, and adapted to receive against their heads the ends of the rods D D and stop their rearward movement in that direction.

The leveling-tool J, (shown in Fig. 5,) being a kind of plane, has a bit or knife, $p$, preferably set at an angle to the long axis of the plane-stock, and the plane-stock is provided with right-angled flanges $q$ $q$, one at its front and another at its rear end, each having a longitudinal slot, said plane-stock being adapted to fit into a slot in the face-plate C, and to slide therein toward and from the center of the plate, to be adjustably affixed to said plate at a desired distance from the center by bolts or set-screws through the slots in said flanges, as shown in Figs. 2 and 3.

The chamfering-tool (shown in Figs. 6, 7, and 8, and as K in Figs. 2 and 3) has the sole of its stock curved in the line of its long axis, and beveled across said axis, and is provided with a bit having a cutting-edge at an angle to its long axis greater or less than a right angle, and so adjusted and held in its bed parallel with the beveled face of the sole of the stock as to cut a chamfer corresponding to the bevel of the sole of its stock. The bit is adjustable and held in place on its bed by a set-screw or other equivalent means. The stock of this chamfering-tool is provided with a rigid lug, $r$, on its inner side, across its long axis, adapted to fit into a slot in the face-plate C, and in which slot it slides toward and from the center of the plate, and is adjustably affixed thereto by the washer and set-screw $s$, or equivalent means. I preferably use two each of the leveling and chamfering tools on the face-plate at the same time, one on each side of the center, opposite each other.

The howeling-tool shown in Fig. 9, and as L in Fig. 4, has the sole of its stock curved in the line of its long axis, and slightly rounded across said axis, and is provided with a bit, having an edge slightly convex centrally, (the tool being a kind of compass plane,) the bit being adjustable and held in position upon its bed by a set-screw or other equivalent means. The stock of this tool, near its rear end, is pivoted by a bolt, $t$, to a block, which block fits into and slides freely in a slot toward and from the center in the plate C, and is adjustably held therein by a set-screw and washer, $u$, or other equivalent means. Near its front end the stock of this tool is pivoted to the rod $v$, by and through which it is connected with certain adjusting mechanism, hereinafter to be described.

The howeling and crozing tools are so pivoted to the face-plate with reference to their form that when the face-plate revolves rapidly the centrifugal force will carry the tools directly away from and consequently directly against the pivot by which they are attached to the face-plate, the pivot being placed as nearly as possible in the radial line of the center of centrifugal motion of the tool on the revolving face-plate.

The crozing-tool shown in Figs. 10 and 11, and as M, Figs. 2, 3, and 4, also has a stock having its sole curved in the line of its long axis, and slightly rounded outwardly in the center across said axis. In this tool a bit is used, having such shaped edge as will cut a croze of the desired form. In Figs. 2 and 3 a bit is shown having an acute-angled edge adapted to cut a V-shaped croze, and in Figs. 10 and 11 a bit is shown consisting of two side-cutting gage-knives, and a central following router adapted to cut a square ⌴-shaped croze. The bits in this tool are adjusted and held in place by set-screws or other equivalent means. The stock of this tool, near its rear end, is pivoted by a bolt, $w$, to a block, $x$, which block fits into and slides freely in a slot toward and from the center in plate C, and is adjusted and held therein by a set-screw and washer, $y$, or other equivalent means. Near its front end the stock of this tool is pivoted to the rod $z$, by and through which it is connected with certain adjusting mechanism, hereinafter to be described.

The crozing-tool shown in Figs. 10, 11, and 4, adapted to cut a square croze, and commonly used in constructing oil and water tight barrels, is so used in connection with the howeling-tool; but in the construction of flour-barrels or casks of similar style, both the howeling-tool and the square-croze cutting tool may be removed from the face-plate C, and the V-croze cutting tools attached to the plate instead, as the howeling-tool is not commonly used in finishing such barrels, nor is the square-cut croze required.

In the rear of the plate C and around the shaft or mandrel B is a sleeve or collar, N, sliding freely on said shaft, and provided with a flange, $a'$, on its end, facing toward the plate C, and in the rear thereof with the circular groove or recess $b'$. Affixed to said flange $a'$ are two or more rods, $c\ c'$, standing out to the front of said flange, and through apertures therefor in the plate C, and terminating at some little distance in front of said plate C in heads adapted to receive and retain against their inner surfaces one end of the coiled springs $d'\ d'$, which springs are coiled about said rods and rest at their inner extremities upon and are resisted by the outer or front surface of said plate C, said springs $d'\ d'$ being adapted to hold the flange $a'$ of collar N up firmly against the rear of the plate C. The functions of the springs $d'\ d'$, coiled upon rods $c'\ c'$, may be performed by lever $o$, hereinafter described; but I prefer to use the springs and rods.

The hand-lever O is pivoted for a fulcrum to a bracket rigidly affixed to the frame A, and at the end of its short inner arm has a lug or pin, which enters and moves freely in the groove $b'$ in collar N. By means of power applied to this lever at the end of the long outer arm, giving it a forward motion, the collar N is drawn rearward away from plate C, while when such power is released the springs $d'\ d'$ bring the collar forward again up to the plate C.

To the flange $a'$ of collar N are affixed rods $e'\ e'$, which extend forward from said flange through apertures therefor in plate C, and at their front outer extremity are each pivoted to the end of one arm of one of the bell-cranks or acute-angle levers $f'\ f'$, which levers are each pivoted at its angle to a bracket rigidly affixed to the face of the plate C, and which levers at the outer ends of their other arms are respectively pivoted, the one to rod $v$, the other to rod $z$, hereinbefore described. The rods $v$ and $z$ are made in two parts, $g'$ and $h'$, and are adjustable in length, that they may be lengthened or shortened, as required, to carry the front end of the howeling or crozing tools, respectively, outward from or inward toward the center of the face-plate C in correspondence and harmony with the outward or inward movement and adjustment of the rear end of these tools, respectively, in the slots in which they move. To permit this adjustment of rods $v$ and $z$, the short rod $h'$ at its inner end has a rigid right-angled lug provided with an aperture, through which aperture the inner end of short rod $g'$ is adapted to pass and to be adjusted and held in position by a screw-thread cut thereon and the nuts $i'\ i'$, one on either side of the lug on the end of arm $h'$. I do not wish to limit myself to this particular form of adjustment of the rods $v$ and $z$, but should use any other of the known equivalent mechanical forms of constructing an adjustable rod for lengthening or shortening said rods for the purpose described.

By this mechanism for holding, adjusting, and operating the howeling and crozing tools I secure such easy and reliable adjustment, such steadiness in work, and accuracy in the results obtained as have not been attained by the machines heretofore known.

The operation of this machine is substantially as follows: The shaft B, being caused to revolve by a power-carrying belt passing over the fixed pulley $b$, carries with it, rotating rapidly, the face-plate C. This face-plate has affixed thereto and properly adjusted thereon the leveling-tools J J, the chamfering-tools K K, the howeling-tool L, and the crozing-tool M, all which are carried with it in its revolutions. The proper adjustment of these several tools on said plate will be readily seen, and is such as to adapt each to perform the work which it is especially designed to accomplish. A barrel being placed horizontally on the flange $h$ and corresponding flange on cross-bar F, (the main part of cross-bar F being in front of the barrel,) is quickly pushed rearward into the ring E as far as the ring will by its size permit it to go, by power applied to hand-lever $l$, pressing it down thereby through the cross-rod G, arms $j\ j$, and rods $k\ k$, sliding the bar F toward the ring E, which is held stationary therefor by holding the hand-lever $o$. Thereupon, by raising the free end of hand-lever $o$, which acts upon cross-rod H, arms $m\ m$ and rods $n\ n$, the cross-bar $f$, sliding rods D D affixed to said cross-bar $f$, cross rod G, cross-bar F, and the thereon-supported barrel are carried rearward, taking the end of the barrel that projects rearward through the ring E against the leveling and chamfering tools on the revolving face-plate C, where the chine is evenly and quickly leveled and chamfered, continuing to so level and chamfer until the rods D D strike against the heads of the adjusting-bolts I I, when immediately thereupon (the barrel still remaining in the same place) by drawing the lever O forward the howeling and crozing tools, which theretofore have not come in contact with the barrel, are pushed outward and held to their work on the inside of the chine by and through the action of the short arm of said lever O against the collar N in groove $b'$, throwing said collar away from the plate C, and thereby, by and through the rods $e'\ e'$, angle-levers $f'\ f'$, and rods $v$ and $z$, pushing the front ends of the stocks of said tools outwardly, as hereinbefore described, whereby a complete and perfect chine to the barrel is easily and quickly made.

By reversing the operation, respectively, of the levers O, $o$, and $l$, as just described, the barrel may be readily removed.

What I claim as new, and desire to secure by Letters Patent, is—

1. In a barrel-machine, the barrel-carriage consisting of a ring, E, supported and adjustable upon two parallel rods, D D, the crossbar F, movable upon said rods D D, the rotating cross-rod G, having bearings in lugs $i\,i$, adjustable on said rods D D, said rod G being connected to the bar F by the arms $j\,j$ and links $k\,k$, and the parallel rods D D, having reciprocal movement in lugs $e\,e$, rigid on frame A, substantially as described.

2. In a barrel-machine, the combination of the driving-shaft B, the face-plate C, rigid on said shaft, the collar N, sliding upon and rotating with the shaft B, said collar being provided with flange $a'$ and groove $b'$, the rods $c'\,c'$, rigid to said collar N, and passing movably through the face-plate C, the springs $d'\,d'$, the rods $e'\,e'$, rigid at one extremity to collar N and at the other end connected to levers $f\,f$, levers $f\,f$, rods $v$ and $z$, connected at one end to levers $f\,f$ and at the other extremity to a howeling or crozing tool, and the lever $o$, substantially as and for the purpose described.

3. In a barrel-machine, the combination of the driving-shaft B, the face-plate C, rigid on said shaft, the collar N, sliding upon and rotating with the shaft B, said collar being provided with flange $a'$ and groove $b'$, lever $o$, one end of which runs in groove $b'$, rods $e'\,e'$, rigid at one extremity to collar N and at the other end connected to levers $f\,f$, levers $f\,f$, and the adjustable rods $v$ and $z$, connected at one end to the levers $f\,f$ and at the other extremity to a howeling or crozing tool, respectively, substantially as and for the purpose set forth.

4. In a barrel-machine, a howeling or crozing tool pivoted to the revolving face-plate, and having its front end adapted to be moved in or out toward or from the center of the face-plate by rods $v$ or $z$, connected thereto, said rods being attached to mechanism adapted to that purpose when said tool has its cutting device between said pivot and said front end, substantially as and for the purpose described.

In testimony whereof I affix my signature in presence of two witnesses.

DAVID MURRAY.

Witnesses:
C. T. BENEDICT,
G. M. GRIDLEY.